Dec. 9, 1958   M. SCHWARTZ ET AL   2,863,988
PHOTOFLASH UNIT
Filed Jan. 22, 1954   8 Sheets-Sheet 3

*INVENTORS*
MORRIS SCHWARTZ
WILLIAM CASTEDELLO
EDWARD K. KAPRELIAN

BY
ATTORNEY

FIG. 10

INVENTORS
MORRIS SCHWARTZ
WILLIAM CASTEDELLO
EDWARD K. KAPRELIAN

BY
ATTORNEY

Dec. 9, 1958   M. SCHWARTZ ET AL   2,863,988
PHOTOFLASH UNIT

Filed Jan. 22, 1954   8 Sheets-Sheet 6

INVENTORS
MORRIS SCHWARTZ
WILLIAM CASTEDELLO
EDWARD K. KAPRELIAN

BY
ATTORNEY

Dec. 9, 1958 M. SCHWARTZ ET AL 2,863,988
PHOTOFLASH UNIT
Filed Jan. 22, 1954 8 Sheets-Sheet 8

INVENTORS
MORRIS SCHWARTZ
WILLIAM CASTEDELLO
EDWARD K. KAPRELIAN

BY
ATTORNEY

United States Patent Office 2,863,988
Patented Dec. 9, 1958

2,863,988

PHOTOFLASH UNIT

Morris Schwartz, William Castedello, and Edward K. Kaprelian, Plainville, Conn., assignors to The Kalart Company Inc., Plainville, Conn.

Application January 22, 1954, Serial No. 405,596

9 Claims. (Cl. 240—1.3)

The present invention relates to photoflash units, also known as flash guns.

A now preferred though not exclusive field of application are photoflash units employing the so-called B–C system. This system involves a circuit system in which a capacitor connected in series with an ohmic resistor is charged by a source of direct current usually a battery and is discharged through one or more flash bulbs thereby firing the same by closing a switch means short-circuiting the resistor and the D.-C. source.

Photoflash units, whether of the battery operated kind or the capacitor operated kind, generally comprise a casing housing the electric components including most of the wiring system of the unit, a flash lamp socket supported by the casing and a reflector optically coacting with a flash lamp fitted in the socket to distribute the light of the flash produced by the lamp. Modern flash units are also generally equipped with an ejector for ejecting a spent lamp. This ejector is actuated by manipulating an appropriately placed actuating member. Present day flash lamps are usually coated with an appropriate plastic to prevent a shattering of the lamp globe when weakened by the firing of the lamp. Practical experience shows that in spite of the protective coating there is a certain danger of a shattering of the lamp globe which may result in injury to the operator and the person to be photographed and in any event constitutes a nuisance. To confine the parts of a shattered globe within the space circumscribed by the reflector, it is known to provide a removable shield in front of the reflector which shield also may serve to support a filter.

One of the major objects of the present invention is to provide a novel arrangement structurally and functionally combining the protective shield and the ejector so that upon opening of the shield a lamp previously inserted in the socket is automatically ejected.

A more specific object of the invention is to provide an arrangement such that the opening movement of the shield effects an ejection of a previously inserted lamp whereas the same movement of the shield in the direction for closing does not effect an ejection of an inserted bulb. As a result, a spent lamp can be conveniently replaced without re-ejection when the shield is returned into its position in front of the reflector.

Another danger inherent in photoflash units, again whether of the battery operated or the capacitor operated kind, is that due to a faulty connection either within the flash unit or in the external connections thereof, the flash circuit of the unit may be closed, except for the gap formed by the terminals of the lamp socket. In such case, a lamp inserted by the photographer in the socket will complete the flash circuit and the lamp will be fired in the hand of the photographer which is obviously highly undesirable as it endangers the photographer.

Accordingly, a second major object of the invention is to provide a novel arrangement in which the movement of the shield is used to control a safety switch in the flash circuit so that the safety switch is only closed when the shield is placed in its protective position in front of the reflector. This has the advantage that while the lamp may still be prematurely fired when the shield is closed, it cannot be fired in the hand of the photographer. The aforesaid arrangement also eliminates a second cause of an accidental firing of a flash lamp inserted in the socket. Flash units are usually connected to external electric devices such as a synchronizer or a solenoid operated shutter by a connecting cord one plug of which is plugged in the casing of the unit and the other is to be connected to the external electric device. When the latter plug is not plugged in, for instance when the unit is not in use, its contact pins may be short-circuited by contact with a metallic part thereby closing the flash circuit, entailing firing of the lamp. The aforesaid arrangement makes such accidental firing impossible unless the shield is closed and even then it affords the advantage that the photographer is protected.

A more specific object of the invention allied with the next preceding one, is to provide a safety arrangement such that the contacts of a switch included in the flash circuit are biased into a disengaged position and are forced into the engaged position by a member which can coact with the switch contacts for the purpose aforesaid only when the shield is fully closed.

Modern flash photography frequently demands that several photoflash lamps are simultaneously fired to obtain a distribution of the light resulting in modeling of the picture rather than in the flat appearance which is frequent when the picture is taken by means of a single flash originating near to the object of the camera. The B–C system lends itself to the simultaneous use of several flash lamps. By reason of the employment of a capacitative charge for activating the primer of a flash lamp, a single small sized multiple cell battery unit, such as a 22.5 volt battery of the hearing aid type, is sufficient to supply the power for setting off several flash lamps in contrast to the system in which the flash lamps are ignited directly from a battery. In such a battery operated system several flash lamps must be connected in parallel instead of in series as in the B–C system and a comparatively large and heavy battery is required to deliver power sufficient to ignite several lamps. Consequently, the B–C system inherently affords, on one hand, an opportunity of designing a multiple flash unit of small size and low weight but on the other hand, it presents the problem of accommodating the numerous components and the involved wiring and switch means required for a multiple unit in a small casing—which is desirable for reasons of space and weight—and of arranging said components and the wiring and switch means so that they can be rapidly and conveniently assembled and electrically connected. It is also essential that the components of the unit are safely supported and connected within the casing as a flash unit is bound to experience a certain amount of rough handling during normal use.

Accordingly, a third major object of the invention is to provide a novel and improved photoflash unit design in which certain components of the unit disposed within the casing thereof are so arranged that they constitute clamping means for releasably clamping the battery and the capacitor of the unit and also part of the electric circuit connections. Such an arrangement has the advantage that the assembly of the flash unit requires very few, if any, time consuming soldering operations and that the battery and the capacitor can be exchanged when necessary without requiring the loosening or fastening of any wire connections. It further affords the advantage that the operating mechanism of the unit can be crowded in a comparatively small space, resulting in a correspondingly small casing.

Another more specific object of the invention, allied with the next preceding one, is to provide an arrangement which enforces correct polarization of the plug of the connecting cord for connecting the flash unit with external electric devices such as a synchronizer or a solenoid operated shutter and yet permits the use of a standard plug on the connecting cord and a standard socket on the unit.

Still another more specific object of the invention is structurally to combine a photometric calculator with the photoflash unit by mounting the calculator directly on the casing of the unit.

Other and further objects, features and advantages of the invention will be pointed out hereinafter and set forth in the appended claims forming part of the application.

In the accompanying drawing a now preferred embodiment of the invention is shown by way of illustration and not by way of limitation.

Referring now to the figures in detail, Figs. 1 to 4 inclusive illustrate front, side, top and rear views of a photoflash unit according to the invention, more specifically of a flash unit of the B-C kind. The figures show that the unit comprises a preferably plastic casing 1 approximately in trapezoidal form and a reflector 2 of a known design. The reflector is detachably secured to the casing by means of a single screw 3 and two notches 4 in the reflector wall. The notches are engageable by corresponding lugs 5 extending from the casing so that by tightening or loosening of screw 3 the reflector can be conveniently attached to or removed from the casing. Screw 3 has a preferably slotted and knurled head 6 accessible from the outside of the casing. The reflector and the casing are so designed that part of the reflector wall completes the walls of casing 1 as can be seen for instance in Fig. 11. This arrangement provides access into the interior of casing 1 for instance, to replace a battery, by simply loosening screw 3 and removing the reflector. Reflector 2 has an opening 7 in its wall through which a socket 8 for a photoflash lamp 9 protrudes.

Figures 1, 2:
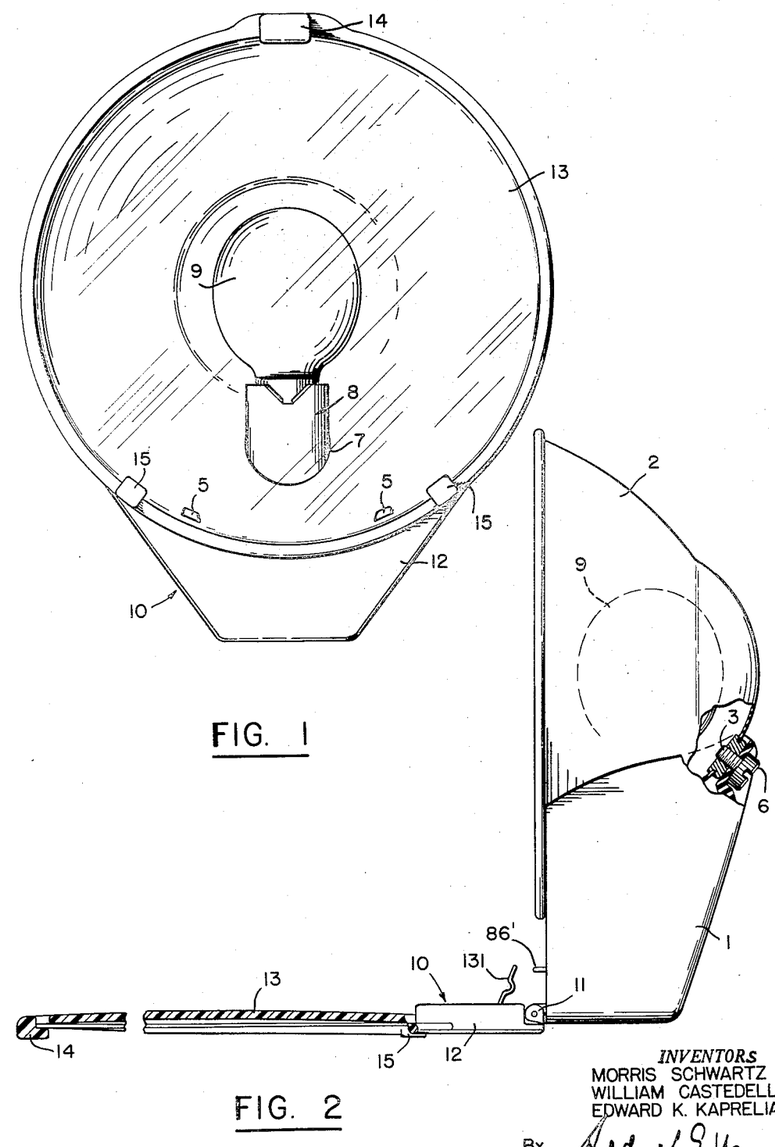
Fig. 1 is a front view of a B-C flash unit according to the invention.
Fig. 2 is a side view of Fig. 1, partly in section, showing the shield in fully opened position.

A protective shield generally designated by 10 is hinged by a hinge 11 to the bottom end of casing 1. Shield 10 is shown as comprising a support base 12 of substantially the same configuration as the corresponding part of casing 1. Base 12 mounts a disc 13 having approximately the same diameter as the rim of the reflector. The disc is made of any suitable material, preferably a transparent, clear plastic. As can be seen in Fig. 2, disc 13 is preferably slightly concave to avoid surface scratches. The outside of the disc or a frame is provided with several grooved flanges 14 and 15 respectively. These flanges serve to receive and removably to retain one or several color filters or a frosted filter which latter filter serves to diffuse the light of the flash.

Figure 3:
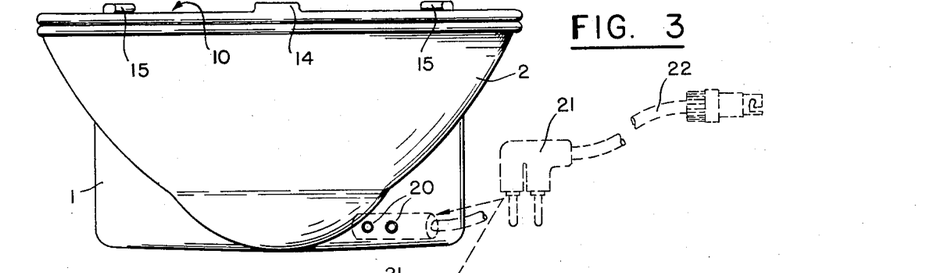
Fig. 3 is a top view of Fig. 1.
Figures 4, 5, 6:
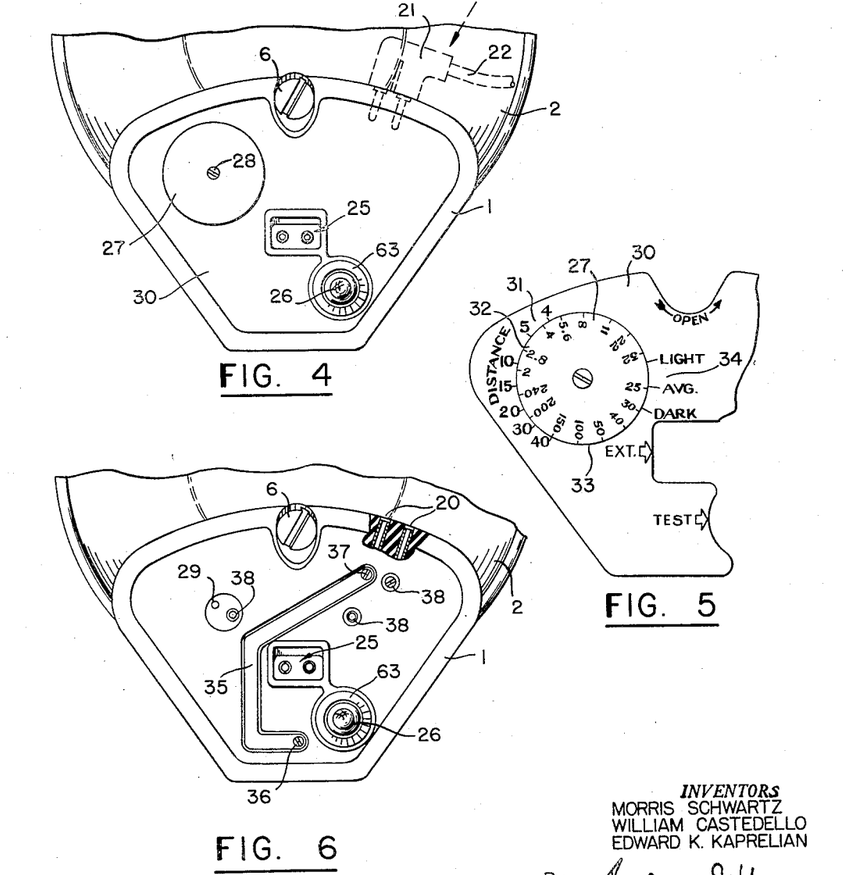
Fig. 4 is a fragmentary rear view of the flash unit.
Fig. 5 is a detail view of Fig. 4 showing the calculator disc of the flash unit on an enlarged scale.
Fig. 6 is a fragmentary rear view similar to Fig. 4 after removal of a cover plate.

There is further shown in Fig. 3 a socket 20 for a plug 21 of a connecting cord 22 for connecting the flash unit to external electric devices. As the source of current is a D.-C. source, the electric devices must be connected with the correct polarity. To assure the correct polarity, the sleeves of the socket are placed in relation to the reflector so that the reflector wall permits an insertion of plug 21 in the correct position only. Figs. 3 and 4 show the plug correctly inserted, and as appears from an examination of these figures, the overhanging wall portion of the reflector prevents an insertion of a plug 21 in the reversed or wrong position.

Fig. 4 shows a second socket 25 which serves to connect a second photoflash unit in series with the exemplified unit, the said unit then constituting the master unit and the additional unit a slave unit. The arrangement of socket 25 will be more fully explained hereinafter. The rear view of Fig. 4 further shows a test light 26 for testing the entire circuit system of the flash unit as will also be more fully explained hereinafter and it finally shows a disc 27 of a photometric calculator. This disc is rotatably mounted by means of a screw 28 threaded in a bore 29 in the casing. The rear wall of a casing 1 is preferably covered with a cover plate 30 which conceals and protects part of the circuit connections of the unit and also bears part of the calibration scales of the calculator as is shown in Fig. 5. The calculator comprises a distance scale 31 on cover plate 30 which coacts with an f-number scale 32 on disc 27 and a guide number scale 33. The cover plate further bears indicia 34 signifying bright, average and dark light conditions. As is well known, the guide numbers are the product of the light output of a flash lamp and the sensitivity of the film used. They are supplied by the respective manufacturers of film. For example, with a shutter speed of 1/50 second, the guide number of a flash lamp known as No. 5 used with film known as Super XX film is approximately 200. This signifies that to obtain a proper flash exposure, the product of the f-number (lens aperture) and the distance, for instance in feet, from the subject to the flash lamp must be 200. Thus proper exposure can be made for example at 20 feet and f/10 and at 50 feet and f/4, the product being 200 in each case. The scales 31 and 32 are so calibrated that each figure of the distance scale 31 is in juxtaposition to the correct f-number on the f-number scale and vice versa.

It will now be apparent that by the simple and single operation of moving one of the light indicia in juxtaposition with the proper guide number, the correct *f*-number for any given distance can be directly read on the scale 32.

Fig. 6 in which the cover plate is removed from the casing finally shows a contact strip 35, preferably fitted in a corresponding groove of the rear wall of the casing. Strip 35 constitutes part of the circuit system of the unit as will appear from the subsequent description and is secured to the casing and connected to other components of the circuit system by screws 36 and 37. Screws or rivets 38 serve to secure components of the circuit system to the casing.

*The circuit system of the flash unit and the testing means therefor*

Figures 8, 9:
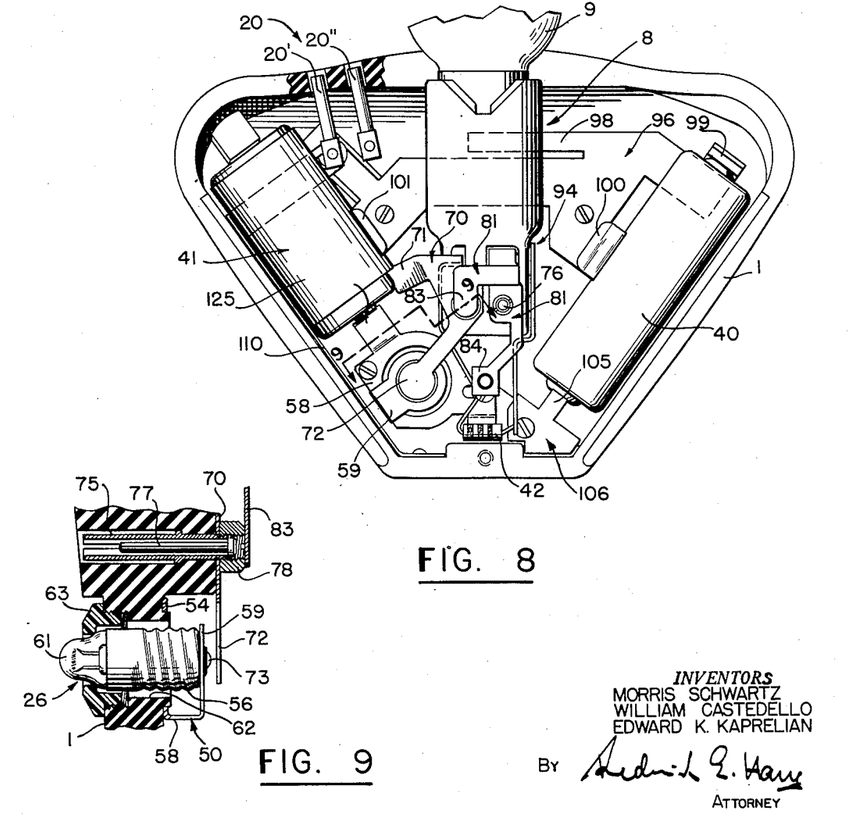
Fig. 8 is a fragmentary front view of the flash unit showing the same with the reflector and the shield removed for exposing the mechanical and electrical components of the operating mechanism of the unit.
Fig. 9 is a section taken on line 9—9 of Fig. 8 on an enlarged scale.

The components of the unit constituting the circuit system thereof and also clamping means for removably retaining the battery and the capacitor in position will now be explained in connection with Figs. 8, 9 and 10. As was previously mentioned, a B–C system includes a battery, a capacitor and a resistor which must be connected in series through the terminals of a flash lamp inserted in its socket for charging the capacitor and switch means to short-circuit the resistor and the battery to discharge the capacitor through the flash lamp. Accordingly, there is shown in Fig. 8 illustrating the assembled unit, a battery 40 such as a hearing aid type 22.5 volt battery, a capacitor 41 and a resistor 42. The unit according to the invention also comprises a test light which can be connected across the terminals of the capacitor for testing the charge of the same.

Figure 18:
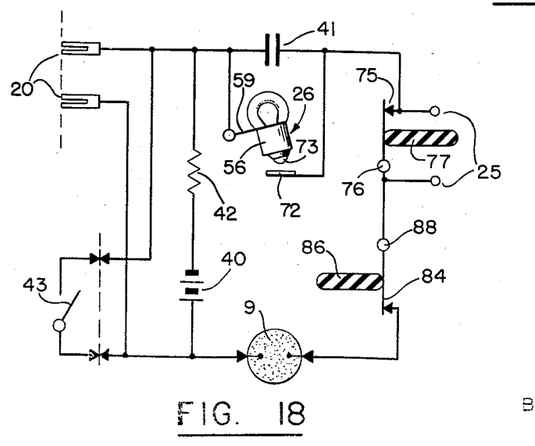
Fig. 18 is a circuit diagram of a flash unit according to the invention.

Referring to Fig. 18, this figure shows the circuit arrangement. Corresponding components are designated by the same reference numeral. The contacts connected in series between the flash lamp 9 and socket 25 for the connection of a slave unit, are contacts of a safety switch which is operated by a movement of the shield as will be more fully explained hereinafter. These contacts may be disregarded for the time being and are assumed to be closed. It is apparent that capacitor 41 will be charged, the ohmic resistance of resistor 42 which is generally in the order of 2000 to 3000 ohms preventing a firing of the flash lamp. When it is desired to discharge the capacitor through the flash bulb for firing the same either switch 43 is closed which short-circuits the battery 40 and the resistor 42 or socket 20 are interconnected which also results in a short-circuiting of the battery and the resistor. Switch contacts 43 may be visualized as representing the switch contact built in the camera shutter and socket sleeves 20 may be visualized as leading to external electric devices to be operated simultaneously with the flash unit.

The circuit system further shows test bulb 26 connected in shunt with capacitor 41 through normally open switch means. Closing of these switch means discharges the capacitor through the test bulb resulting in a brief flicker of the same indicating a proper charge of the capacitor and hence a satisfactory condition of the entire circuit system.

Figure 10:
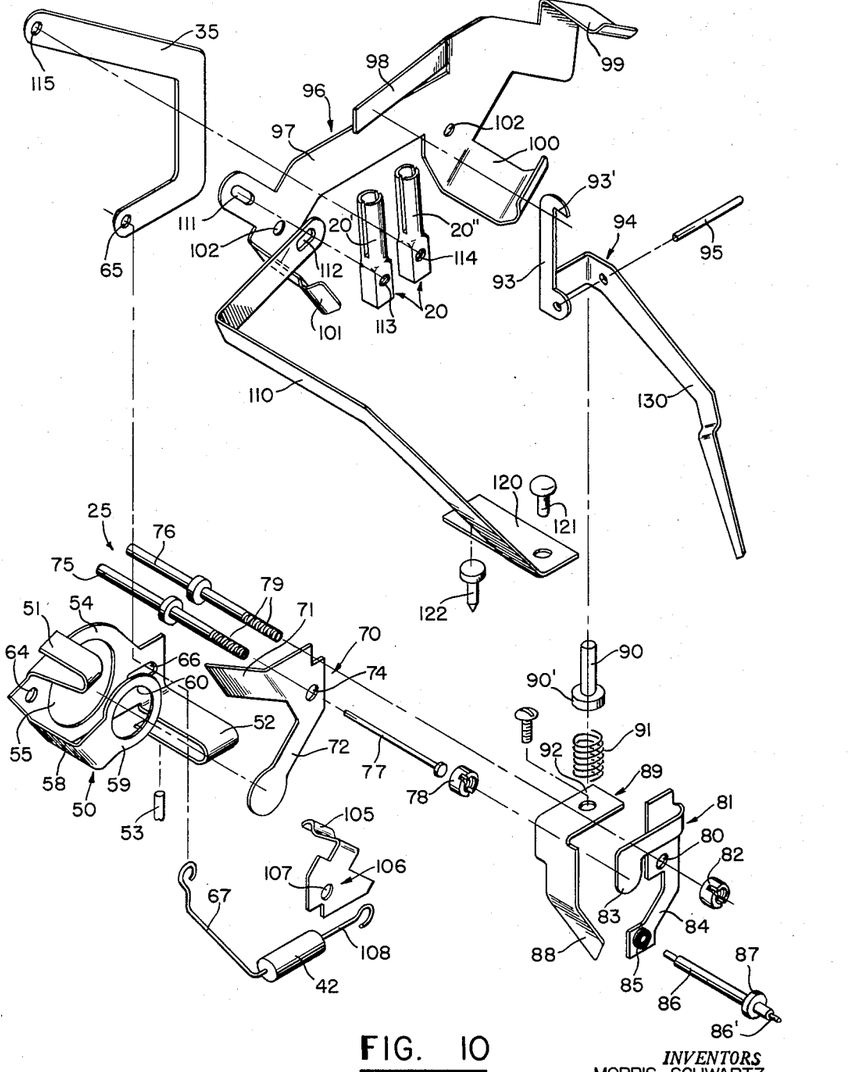
Fig. 10 is an isometric exploded view of the clamping and electrical components of the mechanism.

Figs. 8, 9 and 10 show the components of the flash unit which form the charging circuit, the flash circuit and the test circuit thereof and also serve as clamping means for detachably mounting battery 40 and capacitor 41.

Referring first to Fig. 10, this figure shows, in isometric representation, the configuration of the aforesaid components and the spatial relationship thereof. The dashed lines in the figure indicate the mechanical and electric coactions of the components.

A member 50 which should be visualized as being made of a slightly springy metal such as brass comprises a bent-back tongue 51 engageable with the center terminal of the capacitor and also serving as one of two clamps between which the capacitor is held. A similarly bent-back tongue 52 is engaged by a contact pin 53 when the unit is assembled. This contact pin constitutes one of the terminals of a contact shoe mounting the flash unit on a camera and establishing electric connections with electric devices in this camera as will be more fully explained hereinafter. Member 50 has a base part 54 formed with a circular hole 55 therethrough. Through this hole is extended the base 56 of test bulb 26. An arm 58 is bent off twice from base 54 at right angles to form a bracket 59 parallel with base 54. This bracket is formed with a hole 60 against the rim of which the base 56 of test bulb 26 rests as can best be seen in Fig. 9 whereby member 50 is in contact with the bottom edge of the base of bulb 26. Bulb 26 is preferably of the lens type and is held with its globe 61 in a hole 62 through the rear wall of casing 1 by any suitable means such as a transparent insulation ring or bezel 63 threaded in hole 62. As a result, the filament of the test bulb may be observed from the outside of the casing. The test bulb is retained axially slidable by ring 63 in hole 62 and is biased by the springiness of bracket 59 into the position of Fig. 9.

Member 50 is secured to the inside of the rear wall of casing 1 by any suitable means such as a rivet extended through a hole 64 in base part 54. The member is connected with contact strip 35 and one terminal of the resistor 42. For this purpose screw 36 is extended through a hole 65 in one arm of contact strip 35 and a hole 66 through base 54 of member 50. Hole 66 is preferably elongated to facilitate the locating of member 50. A wire 67 is secured to the terminal thereby connecting member 50 and strip 35 with one end of resistor 42.

Member 50 coacts with a metal member 70. This member is formed with a springy tongue 71 biased into engagement with the metal case of the capacitor which constitutes the second terminal of the same, the first terminal of the capacitor being engaged by tongue 51. Member 70 further comprises a springy contact tongue 72 which faces the bottom terminal 73 of test bulb 26 separated therefrom when the test bulb is biased into the position of Fig. 9. As appears from this figure, the bottom terminal 73 of the test bulb can be moved into engagement with contact tongue 72 by axially depressing the test bulb in its hole 62 against the spring action of bracket 59 whereby the terminals of the test bulb are connected with members 50 and 70. Member 70 is finally provided with a hole 74 through which is extended in electric contact therewith a socket sleeve 75 of socket 25, the other socket sleeve of this socket being designated by 76. The location of socket 25 can best be seen in Fig. 4. As already mentioned, it serves to connect an additional flash unit to the illustrated flash unit in series with the flash lamp and other pertinent components thereof. For this purpose, a headed insulation pin 77 is slidably fitted in socket sleeve 75. The headed end of the pin extends through a bore in a contact nut 78 threaded upon a protruding threaded portion 79 of socket sleeve 75. The other socket sleeve 76 is extended with its threaded portion 79 through a hole 80 in a metal member 81 and mechanically and electrically joined with this member by a contact nut 82. Member 81 has a springy tongue 83 biased into engagement with contact nut 78 as can best be seen in Fig. 9. As a result, member 81 bridges socket sleeves 75 and 76 when tongue 83 is in the position of Fig. 9.

When for the purpose of connecting an additional flash unit to the illustrated unit a plug of a connecting cord leading to the additional unit is inserted in socket 25, the contact pin of this plug entering socket sleeve 75 pushes insulation pin 77 into a position protruding from nut 78 thereby separating contact tongue 83 from nut 78. As a result, the aforementioned electric bridge between socket sleeves 75 and 76 is opened and the additional flash unit can be connected in series between members 70 and 81 (see also Fig. 18).

Member 81 has a second springy contact tongue 84 which supports an insulation disc 85. Tongue 84 coacts with a pin 86 slidably guided in the front wall of casing 1. Pin 86 has a collar 87 which serves to retain the pin within the casing and an outer end portion 86' protruding from the casing as can best be seen in Figs. 2 and 14. Pin 86 coacts with the hinged shield in that the shield portion 12 presses the pin inwardly when the shield is pivoted from the open position of Fig. 2 into the closed position of Fig. 11. As a result, the inner end of pin 86 engages insulation disc 85 and deflects contact tongue 84 toward engagement with a springy contact tongue 88 of a metal member 89. Tongues 84 and 88 are so disposed that they are engaged only when tongue 84 is deflected by pin 86. In other words, members 81 and 89 are electrically connected when the shield is fully closed and disconnected when the shield is in any position other than its fully closed position. Member 89 constitutes part of one of the two terminals of the lamp socket, or more specifically of the terminal engageable with the bottom terminal of a lamp inserted in the socket 8 of the unit. This socket terminal further comprises a contact pin 90 protruding through the base of the lamp socket and retained by means of a flange 90'. The contact pin is spring loaded in a conventional manner by means of a coil spring 91 in metallic contact with contact pin 90 and the horizontal base 92 of member 89. The second terminal of the lamp socket is formed by the hooked arm 93 of a metal member 94 pivotally mounted in casing 1 by means of a pivot pin 95. Hook 93' of arm 93 is engageable with the base terminal of an inserted flash lamp or more specifically with one of the bayonet pins 9' of the lamp base. As can best be seen in Figs. 11 and 14, socket 8 has two axial slots 97, one for the hook and one of the bayonet pins and the other for the second bayonet pin. The lamp socket is made of insulation material so that the only connections between the lamp terminals and the circuit system of the flash unit are through contact pin 90 and hooked arm 93. In addition to forming one of the socket terminals, member 94 also constitutes part of the ejector of the flash unit as will be more fully explained hereinafter. There is further shown a metal member generally designated by 96. This member has a flat base portion which is slotted to form a springy tongue 98 bent to engage the hook 93' of arm 93 and to bias said arm and with it the entire member 94 into a position in which hook 93' overlies the respective bayonet pin 9' (see Fig. 11). Member 96 further serves to support and connect battery 40. For this purpose a flexible tongue 99 engages and presses against the terminal at one end of battery 40. A springy arm 100 presses against the side wall of the battery for clamping the latter between the respective slanted side wall of casing 1 and springy arm 100. Similarly, a springy arm 101 extending from the flat base of member 96 abuts against capacitor 41 in springy engagement. Both arms 100 and 101 serve merely as mechanical clamping means while tongue 99 acts both as a terminal connection and as a clamping means. Member 96 is secured to the rear wall of casing 1 by any suitable means such as rivets extended through holes 102. The other end terminal of the battery is in clamping engagement with a springy tongue 105 of a metal member 106 which is also connected by any suitable means such as a rivet extended through hole 107 with a wire 108 leading to the second terminal of resistor 42.

Reverting to member 96, this member is further connected to a contact strip 110 and socket sleeve 20' of socket 20. This connection can be made by any suitable means. There are shown elongated holes 111 and 112 in member 96 and contact strip 110 respectively and a transverse hole 113 through socket sleeve 20'. A rivet or screw may be passed through these holes, the elongation of holes 111 and 112 facilitating location of the respective parts.

The second socket sleeve 20" of socket 20 is connected with contact strip 35 through the rear wall of the casing, the said casing being made of insulation material.

This latter connection is made by screw 37 extending through holes 114 and 115 through sleeve 22' and contact strip 35 respectively.

Figure 21:
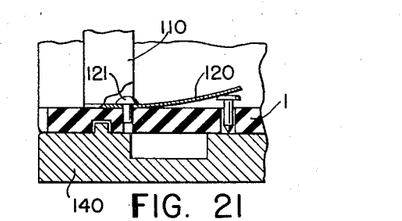
Fig. 21 is a section taken on line 21—21 of Fig. 20.
Figure 22:
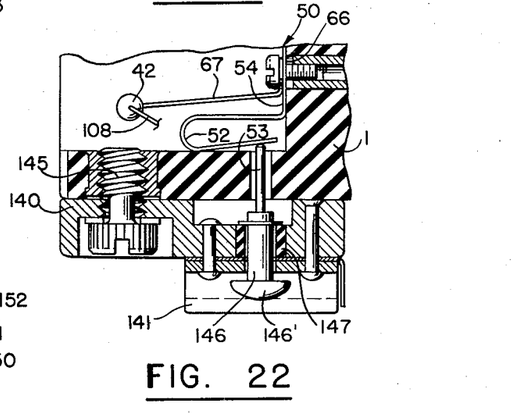
Fig. 22 is a section taken on line 22—22 of Fig. 20.
Figure 23:
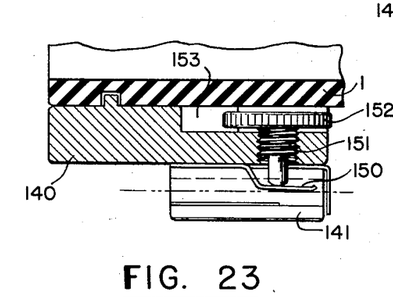
Fig. 23 is a section taken on line 23—23 of Fig. 20.

Contact strip 110 ends in a plate 120 resting upon the bottom wall of casing 1. Plate 120 is secured near one end to the bottom wall by means of a rivet 121 extending through a hole in the plate or by any other suitable means. As a result, the free part of plate 20 acts in the nature of a leaf spring and serves to press a pointed pin 122 against the metal body of a contact shoe forming an adapter as will be more fully described hereinafter (see Fig. 21).

The components described in detail in connection with Fig. 10 are mounted within and on casing 1 as is shown in Figs. 6 and 8. The arrangement of the components in these figures and in particular in Fig. 8 is apparent from a comparison with Fig. 10. It suffices to state that Fig. 8 shows the battery 40 and the capacitor 41 in position and also the lamp socket which parts are omitted in Fig. 10 for reason of clarity.

Figure 19:
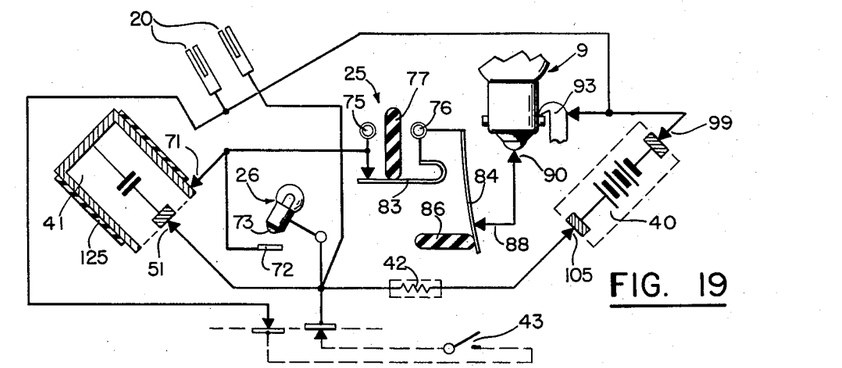
Fig. 19 is a similar circuit diagram but showing the approximate relative positions of the components within the unit.

Referring now to Fig. 19, this figure is a circuit diagram corresponding to Fig. 18 but shows the component of the units in approximately the same physical relationship in which they appear in Figs. 8 and 10. The same numerals have been used to designate corresponding parts.

Fig. 19 will be apparent from the previous description. It suffices to state that an insulation sleeve such as a paper sleeve 125 on capacitor 41 prevents conductive contact between clamping arm 101 and the capacitor. The capacitor is charged when contact tongues 84 and 88 are moved into engagement by closing the shield and is discharged by closing either switch 43 or bridging socket 20. In either case battery 40 and resistor 42 are short circuited. The charge of the capacitor may be tested by moving the bottom terminal of test bulb 26 into contact with contact tongue 72.

*The ejecting means of the flash unit*

The arrangement of the ejector of the flash unit is basically such that hook or nose 93' overlies the respective bayonet pin 9' of an inserted flash lamp when shield 10 is fully closed thereby retaining the lamp in its socket, that nose 93' is withdrawn from the engaged bayonet pin when the shield is pivoted toward its open position thereby releasing the lamp for ejection and that the nose is released for return into its catch position when the shield reaches a certain open position and is permitted to remain in its catch position when and while the shield is returned into its closed position. As a result, the spent flash lamp is ejected when the shield is opened but a newly inserted flash lamp is not re-ejected when the shield is pivoted through the same angle but in opposite direction.

The ejecting means can best be seen in Figs. 11 to 17 inclusive which will now be described in detail.

Figure 11:
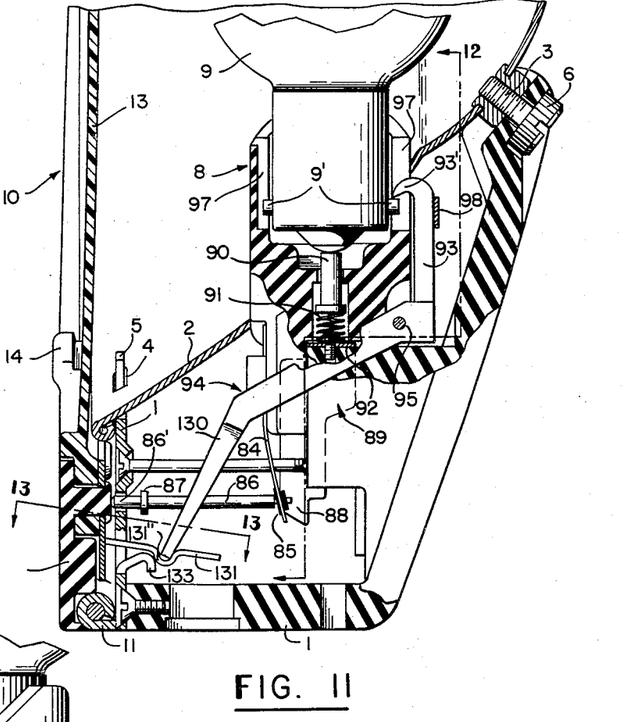
Fig. 11 is a vertical sectional view of the flash unit with the shield in its closed position.

As previously mentioned, member 94 serves a dual purpose. It constitutes one of the socket terminals and also part of the ejecting means. To perform the latter purpose, it is provided with a lever arm 130 which is preferably rather thin so that it can be laterally flexed. The end portion of arm 130 coacts with a springy catch member 131 laterally extending from the shield base 12 for movement in unison therewith. The catch member extends in the closed or near closed position of the shield into casing 1 through an opening 132 in the front wall of the casing. Its configuration can best be seen in Figs. 13 and 17. These figures show that the free end of the catch member is formed with a laterally extending nose. A springy tongue 133 may be bent out of the material of the front wall of the casing. This tongue is in engagement with a detent 131" formed in catch member 131 when the shield is closed or very nearly so that tongue 133 and member 131 form a catch releasably holding the shield in its closed or shielding position. Fig. 11 shows the pivotal position of member 94 in which hook or nose 93' thereof overlies the respective bayonet pin 9'. The end of arm 130 is engaged by a nose 131' of member 131 (see Fig. 13). Springy arm 98 of member 96 abutting against arm 93 of member 94 urges the latter member into the aforesaid position. Let it now be assumed that the shield is tilted from the position of Fig. 11 or Fig. 12 which shows the same shield position as Fig. 11, into the position of Fig. 14. Then, nose 131' being in engagement with arm 130 pivots member 94 into the position of Fig. 14 in which nose 93' is disengaged from the engaged bayonet pin. As a result, spring 91 which was loaded by engagement of contact pin 90 with the bottom terminal of lamp 9, is released and ejects the lamp.

Figure 7:
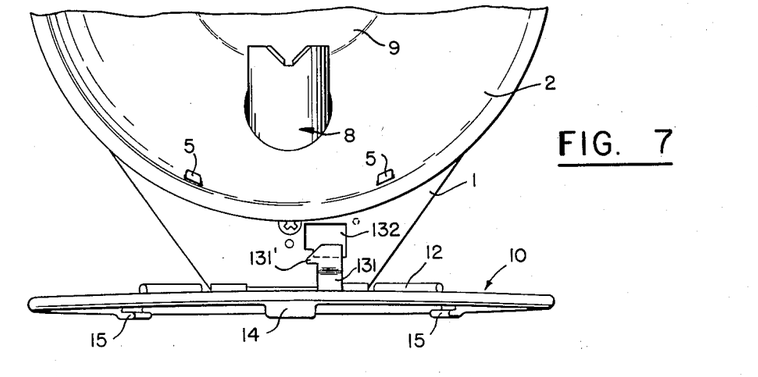
Fig. 7 is a fragmentary front view of the flash unit showing the shield in a position similar to the position of Fig. 2.
Figures 14, 15, 16:
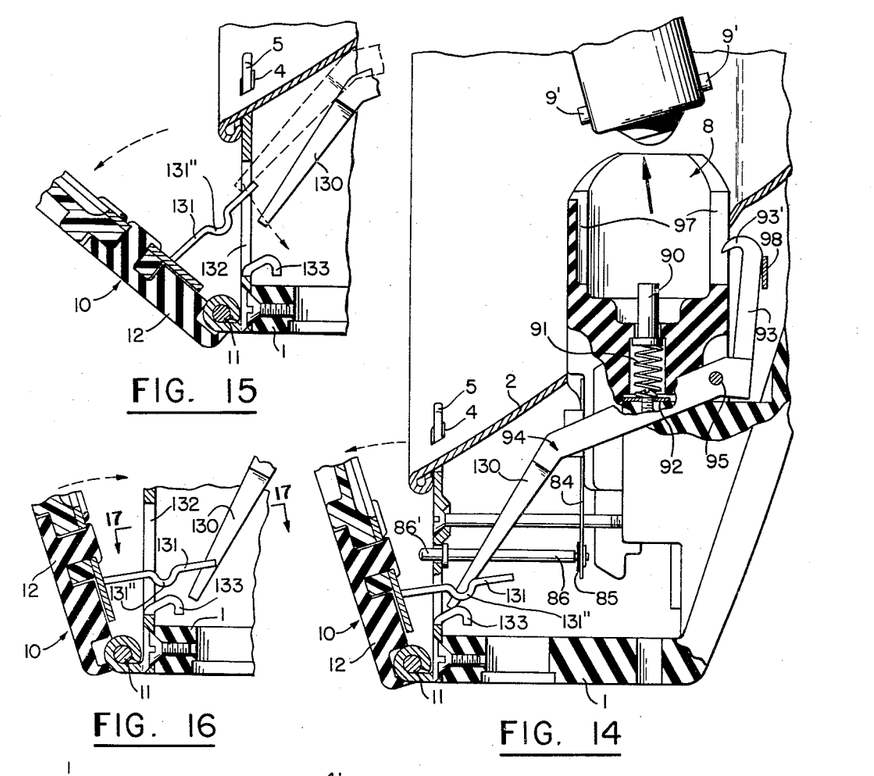
Fig. 14 is a sectional view similar to Fig. 11 but showing the shield partly moved toward its open position.
Fig. 15 is a sectional view similar to Fig. 14 showing the shield further advanced toward its open position.
Fig. 16 is a sectional view similar to Fig. 15 showing the shield during its return movement into the closed position.

When the opening movement of the shield is continued, arm 130 is further pivoted in clockwise direction until a maximum pivot position is reached which is shown in Fig. 15 in dotted lines. In this position, the outermost end of arm 130 slides over the nose of member 131. Consequently, the spring action of tongue 98 is released whereby member 94 is snapped back into the position of Fig. 11 shown in Fig. 15 in full lines. A further pivoting of the shield into the position of Fig. 2 or Fig. 7 has no effect upon the position of member 94 and particularly of its nose 93'.

Figures 12, 13:
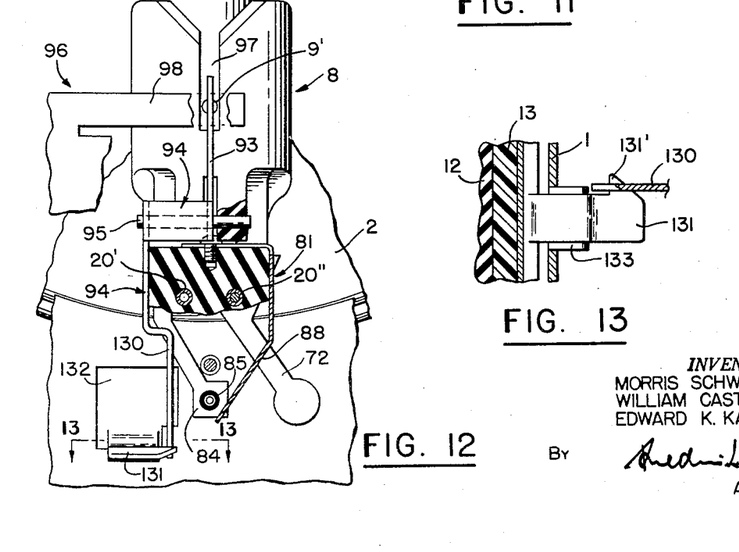
Fig. 12 is a sectional view taken on line 12—12 of Fig. 11.
Fig. 13 is a fragmentary sectional view taken either on line 13—13 of Fig. 11 or on line 13—13 of Fig. 12.
Figure 17:
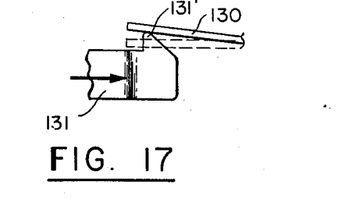
Fig. 17 is a sectional view taken on line 17—17 of Fig. 16.

Figs. 13 and 17 show that arm 130 is aligned with the nose portion of the catch member 131 rather than with the main portion of this member. These figures further show that the nose is slanted at its edge facing arm 130. As a result, the slanted edge of the nose will engage the end portion of arm 130 during the initial part of the closing movement of the shield. Figs. 16 and 17 show this engagement between the nose and the end of arm 130 and also that arm 130 is laterally flexed. As the closing of the shield is continued the nose and the end of arm 130 finally reach a relative position in which the arm is engaged by the nose or in other words is again in the position of Fig. 13.

As appears from the previous description, the return movement of the shield does not involve any pivotal movement of member 94 so that hook 93' continuously remains in the position of Fig. 11.

*Operation of the flash unit*

The operation of the flash unit as hereinbefore described is as follows:

Let it be assumed that a capacitor and a battery are fitted between the respective terminals and clamps as previously described and that a flash lamp is inserted in the socket. As appears from the previous description, the respective bayonet pin 96 can pass hook 93' protruding into its path of insertion by slightly turning member 94 in clockwise direction against the action of springy tongue 98. Let it further be assumed that the shield is fully closed. As a result, the circuit is completed by pin 86 pressing contact tongue 84 of member 81 into engagement with contact tongue 88 of member 89. Furthermore, hook 93' overlies the respective bayonet pin thereby retaining lamp 9 in the socket.

If it be desired to test the circuit connections, the photographer presses test bulb 26 inwardly thereby closing a discharge circuit for the capacitor through contact points 72 and 73. A short flicker of the lamp and the intensity of the flicker will give an indication whether the capacitor was properly charged which in turn is an indication that there is no interruption in the circuit system as all the components thereof are connected in series.

In case the operator wants to connect a slave unit to the illustrated master unit he simply inserts the connecting plug of the slave unit in socket 25 which automatically connects the flash bulb of the slave unit in series with flash bulb 9.

The flash unit is now ready for taking a picture. After having ascertained the proper photometric data from the calculator of the unit, the flash lamp is fired by either actuating switch 43 or the device connected to socket 20.

Let it now be assumed that the picture is taken and it is desired to replace the spent flash lamp by a fresh lamp. For this purpose, the photographer pivots the shield from its closed or shielding position into its open position. Immediately, upon the beginning of the opening movement, pin 86 is released by the shield thereby interrupting the circuit connections at contact tongues 84 and 88. Shortly thereafter, when the shield has approximately reached the position of Fig. 14, hook 93' is withdrawn and the lamp is ejected. When the shield is approximately fully opened hook 93' returns into its catch position of Fig. 11 and the unit is now ready for the insertion and retention of a fresh flash lamp by the photographer.

The proper functioning and operation of a flash unit presupposes that the flash circuit is interrupted at switch 43 and at socket 20 or any device connected thereto. However, experience has shown that due to faulty conditions the flash circuit may be closed except for the gap represented by the terminals of the lamp socket or that the flash circuit may be closed by an accidental contact of the outer plug of connecting cord 22 with a metal part. In either case, the flash circuit would be discharged when the photographer inserts a new lamp and the lamp would be fired in the hand of the operator except for the safety switch formed by contact tongues 84 and 88 and pin 86 coacting therewith. This switch effectively prevents such accidental firing of the flash lamp in the hand of the operator as the flash circuit cannot be discharged unless and until the shield is fully closed and displaces pin 86 for closing of tongues 84 and 88.

After insertion of a new lamp, the photographer closes the shield which as previously explained does not cause a renewed operation of the ejector for ejecting a flash lamp, and the unit is ready for producing a new flash.

*Adapter means for mounting the photoflash lamp*

The flash unit may be mounted by any means, conventional or non-conventional, suitable for the purpose. There are shown in Figs. 20 to 23 an adapter in form of a contact shoe and in Figs. 24 and 25 a bracket for supporting the flash unit and attaching the same to a camera.

Figure 20:
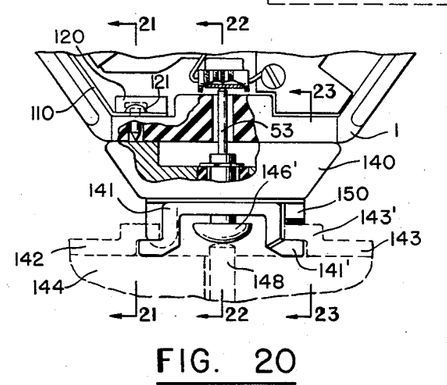
Fig. 20 is a fragmentary sectional view of the unit and of a contact shoe for mechanically and electrically connecting the unit to a camera casing.

The contact shoe according to Figs. 20 to 23 comprises a metal body 140 which is preferably faired into the configuration of casing 1 as can best be seen in Fig. 20. Metal body 140 supports the metal shoe 141 proper the flanges of which are engageable with corresponding conventional guide tracks 142 and 143 secured to the casing of a camera 144, partly shown in phantom. The adapter is secured to the flash unit by a headed screw 145 which may have a floating thread so that the screw is retained in the adapter.

The terminals of the contact shoe are connected to the circuit components within casing 1 or more specifically to plate 120 of contact strip 110 and to contact tongue 52 of member 50. Contact between contact strip 110 and metal body 140 and hence the contact shoe proper 141 is made by contact pin 121 pressing against metal body 140 as can be clearly seen in Figs. 20 and 21. Contact pin 53 which is engaged by springy tongue 52 of member 50 is continued by a headed pin 146. This pin is extended through metal body 140, insulated therefrom by a sleeve 147. Head 146' of pin 146 is disposed between the two flanges of shoe 141 and is engageable with a contact pin 148 connected with one side of the circuit connections within the camera, the other side of said circuit connections being connected to guide tracks 143. The guide tracks 143 and contact pin 148 should be visualized as being included in the circuit of switch 43 of Figs. 18 or 19.

To secure the adapter and with it the flash unit to the camera casing, a leaf spring 150 may be provided in the channel formed between the respective flange of the contact shoe and metal body 140. The free part of this spring coacts with a set screw 151 threaded in a corresponding bore in metal body 140 and provided with a knurled or milled head 152 accommodated in a slot 153 of metal body 140. This screw permits to clamp flange 143' of guide track 143 between spring 150 and flange 141' of shoe 141.

The shoe may also be designed for use as a mechanical adapter only. In that case the contact making components of the shoe such as the parts 53, 146, 146' and 122 are omitted. Synchronization and control of the flash unit are then effected by use of the connecting cord assembly 21, 22 of Figs. 3 and 4 for connecting the flash unit with the camera.

Figure 24:
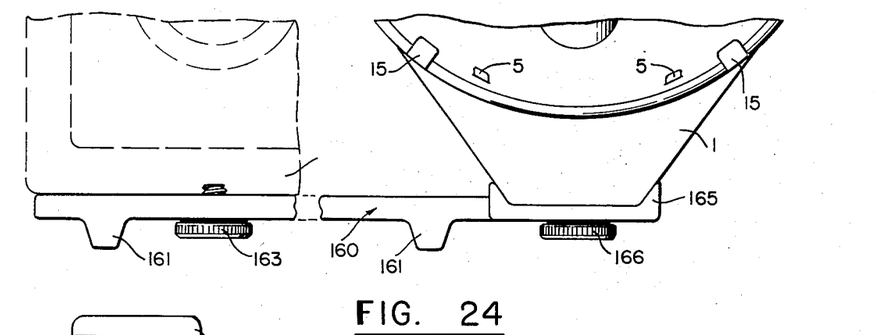
Fig. 24 shows a side view of a bracket for attaching the flash unit to a camera.
Figure 25:
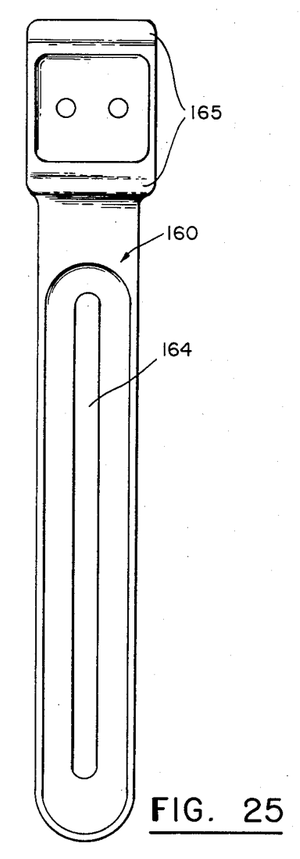
Fig. 25 is a plan view of the bracket of Fig. 24.

Figs. 24 and 25 show a slotted bracket generally designated by 160. This bracket has preferably legs 161 for positioning the bracket and the parts supported thereon on a plane surface. It is attached to the casing of a camera 162 by means of a headed screw 163 threaded in the tripod hole of the camera. Slot 164 permits to vary the position of the photoflash unit relative to the casing within certain limits. The bracket is formed at its respective end with protrusions 165 forming a cradle for the base portion of the casing of the flash unit. The flash unit may be releasably secured to the bracket by a headed screw 166. The electric connection of the flash unit with the camera for purpose of synchronization and actuation is made by inserting plug 21 of connecting cord 22 in socket outlet 20.

While the invention has been described in detail with respect to a certain now preferred example and embodiment of the invention it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent is:

1. A photoflash unit comprising a casing, a photoflash lamp socket supported by the casing, a reflector fixedly supported by the casing, ejecting means associated with said socket for ejecting a flash lamp therefrom, said ejecting means including an actuating means for releasing the ejecting means, a shield supported by the casing movable between a shielding position in front of the socket and the reflector to define in conjunction with the reflector a substantially closed space including the socket and an open position uncovering the socket and the reflector, the said shield engaging said actuating means to actuate the same for release of the ejecting means upon movement of the shield out of its shielding position.

2. A photoflash unit comprising a casing, a photoflash socket supported by the casing, a reflector fixedly supported by the casing, ejecting means associated with said socket for ejecting a flash lamp therefrom, said ejecting means including an actuating means for releasing the ejecting means, circuit means including said socket disposed within the casing for firing a flash lamp inserted in said socket by energizing said circuit means, safety switch means included in said circuit means, said switch means having switch contacts biased into the open position and a switch actuating means, and a shield supported by the casing movable between a shielding position in front of the socket and the reflector to define in conjunction with the reflector a substantially closed space including the socket and an open position uncovering the socket, the said shield coacting with said switch actuating means for holding the switch contacts in the closed position only when the said shield is substantially in its shielding position and further engaging said ejection actuating means to actuate the same for release of the ejecting means upon movement of the shield out of its shielding position.

3. A photoflash unit comprising a casing, a reflector supported by the casing, a photoflash lamp socket supported by the casing, circuit means including said socket disposed within the casing for firing a flash lamp inserted in said socket by energizing said circuit means, a shield supported by the casing movable between a shielding position in front of the reflector and the socket and an open position uncovering the reflector and the socket, and safety switch means included in said circuit means, the said switch means comprising a movable switch contact means and a stationary switch contact means, said movable switch contact means being biased into a position disengaged from the stationary switch contact means, and a switch control member mounted for movement in unison with said shield acting upon the movable switch contact means when the shield is substantially in its shielding position for moving said movable contact means into engagement with said stationary contact means.

4. A photoflash unit comprising a casing, a reflector supported by the casing, a photoflash lamp socket supported by the casing, ejecting means associated with the socket for ejecting a flash lamp therefrom, said ejection means including an actuating means for releasing the ejecting means, circuit means including said socket disposed within the casing for firing a flash lamp inserted in said socket by energizing said circuit means, safety switch means included in said circuit means, the said switch means having a movable switch contact means biased into the open position, and a shield supported by the casing movable between a shielding position in front of the reflector and the socket and an open position uncovering the reflector and the socket, the said shield coacting with said switch contact means for holding the same in a switch closing position when the said shield is substantially in its shielding position and further engaging said actuating means to actuate the same for release of the ejecting means upon movement of the shield out of its shielding position.

5. A photoflash unit according to claim 1, wherein said actuating means of the ejecting means comprise two relatively movable members formed to interlock one with the other in motion transmitting engagement upon movement of the shield toward its open position and to slide freely relative to each other upon movement of the shield toward its shielding position, the said interlocking of the members effecting a relative movement thereof releasing the ejecting means for ejection of a lamp from the socket, the relative position of said members being controlled by engagement with the shield.

6. A photoflash unit according to claim 5, wherein one of the said members is mounted in the casing movable between a position retaining a flash lamp inserted in the socket and a position releasing the lamp for ejection and the other member is supported on the shield for movement in unison therewith, the said interlocking of the members for part of the shield movement effecting movement of the respective member into its release position, and wherein yieldable means bias the said respective member into its retaining position.

7. A photoflash unit according to claim 6, wherein the said member controlling the retention and the release of a lamp has a laterally flexible arm and the said other member has a nose laterally extending therefrom, the said arm coacting with said nose so as to engage the same in locking engagement for the initial part of the opening movement of the shield thereby moving the respective member into its release position and to slide off the nose upon further movement of the shield toward its fully opened position, and upon return of the shield into its shielding position to ride over said nose for the initial part of said return movement and to be laterally flexed by the nose into engagement therewith during the last part of the return movement.

8. A photoflash unit according to claim 3, wherein the said switch control member comprises a pin element mounted axially slidable in the casing; one end of said pin element being in engagement with the movable switch contact means and the other protruding from the casing in a position engageable by the shield thereby effecting an axial displacement of the pin element for the purpose aforesaid when the shield is substantially in its shielding position.

9. A photoflash unit comprising a casing, a photoflash socket supported by the casing, circuit means including said socket disposed within the casing for firing a flash lamp inserted in said socket by energizing said circuit means, a connector socket fitted in a casing wall, said connector socket being electrically connected with said circuit means for connecting external D.-C. operated electric devices with said flash unit by inserting a connector plug in said socket, and a reflector mounted on said casing, the said reflector being disposed on the casing in a position relative to the connector socket such that a wall portion of the reflector blocks an insertion of a plug in said connector socket in a position other than the position of correct polarity for the operation of said D.-C. devices.

References Cited in the file of this patent

UNITED STATES PATENTS

| | | |
|---|---|---|
| 2,099,767 | Marks | Nov. 23, 1937 |
| 2,234,474 | Higham et al. | Mar. 11, 1941 |
| 2,279,933 | Wells | Apr. 14, 1942 |
| 2,329,011 | Steiner | Sept. 7, 1943 |
| 2,584,858 | Fritz | Feb. 5, 1952 |
| 2,595,318 | Wilkinson | May 6, 1952 |
| 2,602,879 | Whelan | July 8, 1952 |
| 2,671,614 | Schwartz et al. | Mar. 9, 1954 |
| 2,747,076 | Eloranta | May 22, 1956 |
| 2,766,371 | Von Wimmersperg | Oct. 9, 1956 |

FOREIGN PATENTS

| | | |
|---|---|---|
| 1,076 | Great Britain | 1910 |